United States Patent [19]
Talbert

[11] 3,779,115
[45] Dec. 18, 1973

[54] NOTCHING MACHINE
[75] Inventor: William Lewis Talbert, York, Pa.
[73] Assignee: Canton Company of Baltimore, Baltimore, Md.
[22] Filed: Nov. 26, 1971
[21] Appl. No.: 202,157

[52] U.S. Cl................. 83/210, 83/276, 83/372, 83/602, 83/917
[51] Int. Cl............................................. B26d 5/20
[58] Field of Search.................. 83/209, 210, 278, 83/372, 602, 917, 276

[56] References Cited
UNITED STATES PATENTS
2,387,650  10/1945  Davis .................................... 83/209
3,411,389  11/1968  Wiese .............................. 83/278 X
2,844,202  7/1958  Pierce ................................. 83/602

Primary Examiner—Andrew R. Juhasz
Assistant Examiner—Leon Gilden
Attorney—Charles L. Harness

[57] ABSTRACT

This panel notching machine comprises a trackway along which synchronously moving chains push a panel under a reciprocating cutter head. Power is applied to the chains by an hydraulic motor. Stopping the oil flow stops the chain motion so precisely that panels can be notched by a reciprocating cutter head and will interfit with any other panels to form a corner joint in a crate or shipping container. Besides notching, the machine will position parts for boring or for any other machining operation which must take place at fixed linear distances.

2 Claims, 4 Drawing Figures

NOTCHING MACHINE

This invention relates to a machine for cutting notches in panels.

The present machine provides means to notch, bore, or otherwise machine parts or panels where the machining operation must take place at fixed linear distances. Specifically, however, the machine which is chosen as the illustrative example of the invention forms tongues and notches in interfitting panels with such precision that any notched panels may interfit with any tongued panel accurately and tightly, and all panels in a manufacturing run will be interchangeable.

Recently a type of pallet-bin has been developed, the separate walls of which can be fitted about a special pallet and then locked into position. This makes it possible for a manufacturer of, e.g., automotive components, to place parts in a bin and send the bin to the automotive assembly plant. When the parts are used, the bin is disassembled and its flat packaged parts are returned to the manufacturing plant. Previously such parts have been shipped in packages or crates, but the cost is substantial. This machine cuts such heavy-duty panels accurately, quickly, and completely automatically.

In the accompanying drawings.

Figure 1:
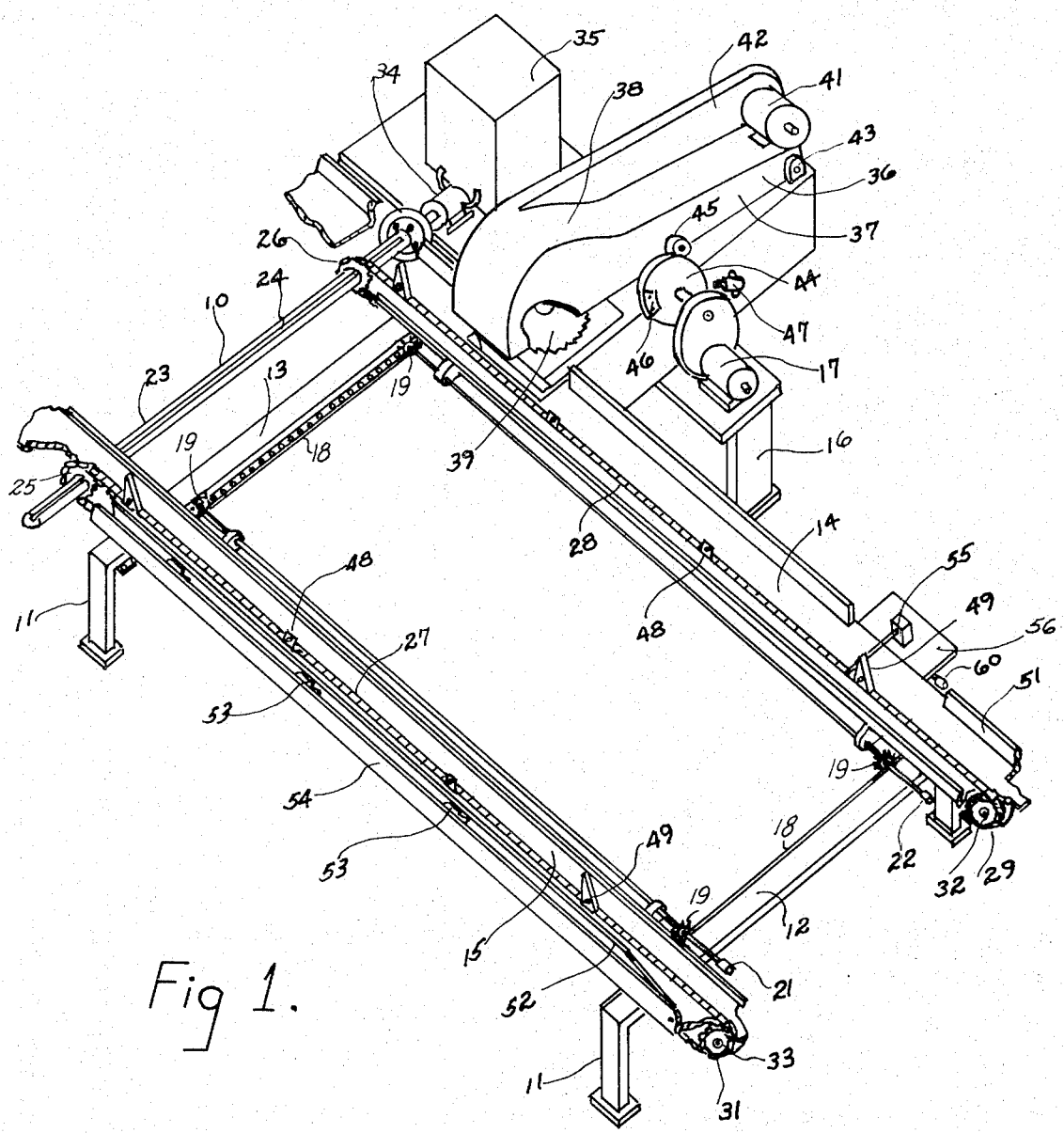
FIG. 1 is a perspective and tilted side view of the notching machine.
Figure 4:
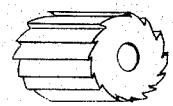
FIG. 4 is a perspective view of the notcher knife (cutting cylinder).

Essentially the machine, 10, rests on a rectangular subframe which is supported on the legs, 11—11. Two transverse members, 12 & 13, are a part of the subframe, and form ways on which the rails, 14 & 15 (which act as material supports and guides) may slide toward and away from each other.

In the present machine, the rail movement is controlled by racks, 18—18, and pinions, 19—19, which allow the rails, 14 & 15, to move in and out when the cranks, 21 & 22, are turned.

A rotatable cross-shaft, 23, is journaled in bearings fastened to the lower surface of rails, 14 & 15. Shaft, 23, is provided with a longitudinal keyway, 24, so that the sprockets, 25 & 26, may be driven through their keys no matter in what position the sprockets are placed along the shaft.

Drive chains, 27 & 28, are looped over sprockets, 25 & 26, and the idler sprockets, 29 & 31. Sprockets, 29 & 31, are held in position by stub shafts, 32 & 33, which are bolted respectively to the rails, 14 & 15.

The notching assembly, 36, comprises a hinged arm, 37, which is combined with a protective hood, 38. The outboard end of the arm is provided with bearings which support a rotary notching knife, 39, which is driven by the electric motor, 41, through a belt running inside the belthousing portion, 42, of the assembly. The inboard end of the arm is pivoted at 43, and so the arm may move up and down in response to the rotation of the cam, 44, bearing on the cam-follower, 45, which in turn is attached to the notcher-arm assembly, causing the arm to ride up and down as cam, 44, rotates.

Cam, 44, also includes a secondary cam, 46, fixed to the face of cam, 44, which operates the switch, 47. The face of cam, 46, is concentric with the axis of rotation of cam, 44. As will later be explained, this switch, in conjunction with other circuitry, operates the hydraulic pump motor, 34.

The gear-head motor, 17, which causes cam, 44, to raise and lower the notcher-arm assembly, 36, is located on an extension, 16, of the subframe of the machine.

Assuming that the machine is forming mating notches and tongues in approximately 3/4-inch plywood, and that the tongues and notches are 6 inches long, lugs, 48—48, are fastened to the chains, 27 & 28, at fixed distances of 1 foot. The notch which is cut in this case will be exactly 6 inches long, as will be the tongues which lie between the notched areas. Cuts at other spacings may be arranged by proper positioning of the lugs, 48, and the timing of the lifting cam, 44.

The cam, 44, raises the notcher knife, 39, when, in the machine which is now described, the panel has been pushed exactly 6 inches along the rails. The resulting notch will fit a mating tongue which has been cut in the adjoining panel.

Pusher dogs, 49, attached to the chains, 27 & 28, in place of the lugs, 48, are set at distances between each set of dogs which just slightly exceeds the height of one panel.

The depth of the notch which will be cut by the rotating notcher knife, 39, is adjusted by moving the rail, 14, so that the notch in the panel will be cut to the proper depth. Rail, 15, is then pushed up against the opposite margin of the panel, and pressure is maintained which holds the panel closely pressed against the flange, 51, of rail, 14, by the movable rail, 52. Rail, 52, is pressed against the panel by a series of leaf springs, 53—53, attached to the outer flange, 54, of rail, 15.

A normally closed stop-control switch, 55, is mounted on sliding plate, 56. Plate, 56, can move longitudinally along the under side of rail, 14, thereby adjusting the linear position of the switch wand in relation to the rail, 14. Any adjusting means can be used. In the specific machine herein described, the adjustment is secured by a threaded rod held in bearings fastened on the under side of the rail, 14, which turns in a nut fixed to the sliding plate, 56. A crank adjustment is provided.

Figure 3:
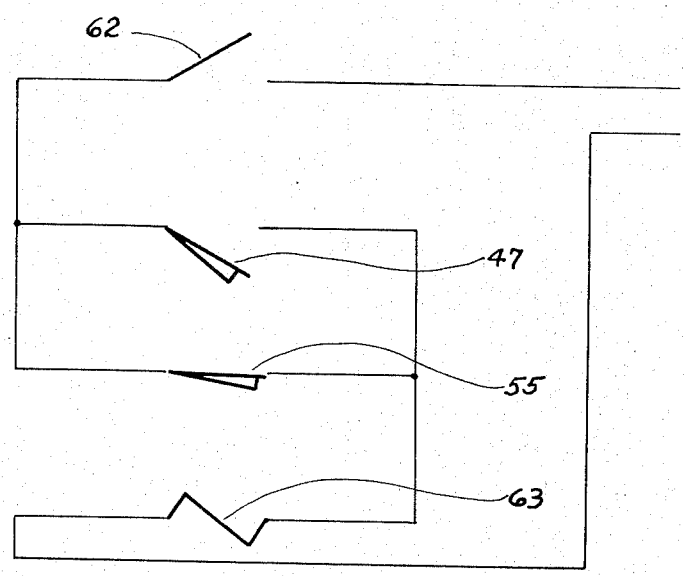
FIG. 3 is a wiring diagram, showing the relation of switches controlling oil flow.

Wiring (FIG. 3) to the solenoid valve, 63, includes a power switch, 62, the normally open stop-control switch, 55, and the normally open plunger switch, 47.

Figure 2:
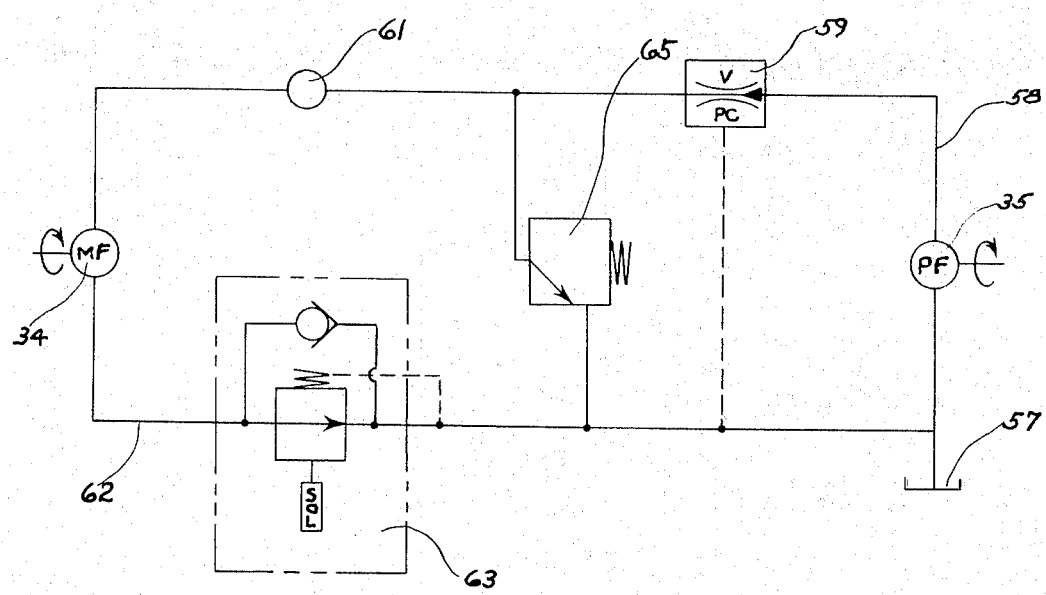
FIG. 2 is a diagrammatic representation of the hydraulic circuits.

The hydraulic system, diagrammatically indicated in FIG. 2, comprises a motor-driven hydraulic pump, 35, housed in an assembly which includes an oil reservoir (in the machine itself, motor pump and oil reservoir, 57, are placed in a single housing).

Oil from the pressure side of the pump, 35, moves through the conduit, 58, and through the adjustable flow valve, 59, past the pressure guage, 61, and on to the oil motor, 34. From the motor, the oil passes through conduit, 62, and back to the oil reservoir, 57.

This pattern of flow is interrupted by the solenoid valve, 63, which is normally closed, but opens when the cam segment, 46, operates the plunger switch, 47. Operation of switch, 47, overrides the stop-control switch, 55, oil flows, and the chains advance pushing the panel ahead until the next lug, 48, touches the stop-control switch, 55. At this moment, the solenoid valve is closed because the plunger switch, 47, which is no longer riding on the cam, 46, is open.

From the time the switch 47 is activated until the time the stop control switch, 55, turns the current off and thus the oil flow, the chain has already advanced and pushed the panel the distance between the spacing of the lugs, 48, on the chains, 27 & 28. At this moment the panel stops and the rotation of cam, 44, lowers the notching head, 36, which cuts a notch in the panel and then rises. The operation repeats itself, the panel next stopping when it has advanced along the rails, 14 & 15, 1 foot, then a new notch is cut.

A shunt oil line, 64, extending between oil conduits, 58 and 62, is interrupted by the pressure relief valve, 65.

In adjusting the system, the pressure relief valve, 65 (FIG. 2), is adjusted so that the torque on shaft, 23, will just overcome the frictional drag on the system and the drag of the panel which is laid on the rails, 14 & 15. The speed of movement of the panel as it is pushed along by the engagement of the dogs, 49, with the rear edge of the panel is adjusted by the flow control valve, 59 (FIG. 2), to advance the panel along the trackway one lug spacing during the interval in which the notcher-arm assembly, 36, is raised. Because flow through the motor is blocked, as soon as solenoid valve, 63, closes, the chains, 27 & 28, stop moving instantly, and no drift or inching forward occurs.

The precision of this linear advance mechanism is extraordinary. The precision of notching on dry plywood panels is so good that any panel taken at random from the lot on which tongues are formed between successive notches will fit any panel having mating notches also taken at random from the run. The closeness of fit produces extremely rugged well-reinforced corner joints. The operation is quite rapid, and high accuracy is maintained through long runs.

As has been stated, the position of the notch on the margin of the panel is determined by the position of the stop-control switch, 55, which has a considerable adjustment.

Since the notches which are to be cut normally occupy the same position on both margins of the panel, after one margin has been notched the panel is turned over and notched on the opposite margin, using the same linear setting. Assume that a set of side panels are to be notched, customarily two panels will be notched with the notch beginning at the top margin of the panel, and two will be notched with the notch beginning 6 inches below the top margin. The latter adjustment, as has been explained, will be secured by sliding the stop-control switch, 55, into proper position, usually by turning crank, 60.

It is not necessary that such a machine be confined to a notching operation. A drill spindle can be substituted for the notching head, and a series of accurately spaced holes can be drilled. Other machine operations which require a tool to work repetitively at accurately spaced linear intervals can also be used.

I claim:

1. A machine adapted for forming tongue and notch joints in the edge of a panel, said machine having:
   A. a base with a pair of spur gears at each end, said spur gears carrying a pair of parallel spaced apart continuous chains; each chain carrying:
      1. upwardly extending lugs uniformly spaced along the chains and adapted to carry the panel and
      2. dogs adapted to push the trailing edge of the panel forward;
   B. a notching head comprising:
      1. a cutting cylinder adapted to cut a notch in the panel of pre-selected width and depth, said cutting cylinder being positioned in a cutting arm journaled to pivot into the panel so that it cuts a notch and then rises clear of the panel;
         a. said cutting arm carrying a cam follower;
         b. first drive means for said cutting cylinder;
         c. a cam rotatable by second drive means to raise and lower said cutting arm; said cam carrying a secondary cam;
   C. a hydraulic circuit with:
      1. third drive means to drive the spur gears;
      2. a solenoid valve adapted to open and close the circuit;
   D. an electrical circuit having:
      1. a normally closed first switch adapted to open on contact with a lug or dog on the chain and operating the solenoid valve instantly to close it, thereby to stop the forward motion of the panel; and
      2. a normally open second switch associated with the secondary cam, being positioned such that after the notching head completes a notch and rises clear of the panel, the secondary cam contacts the second switch, thereby to override the first switch and reclose the electrical circuit and open the solenoid valve, thereby to recommence the forward motion of the workpiece.

2. A machine as claimed in claim 1 having means associated with one of said chains to position the first switch in linear relationship to the desired stopped position of the panel to the fixed position of the said cutting cylinder.

* * * * *